E. A. FALLER.
METHOD OF AND APPARATUS FOR ELECTRIC WELDING.
APPLICATION FILED FEB. 13, 1913.
1,077,953.
Patented Nov. 4, 1913.
2 SHEETS—SHEET 1.
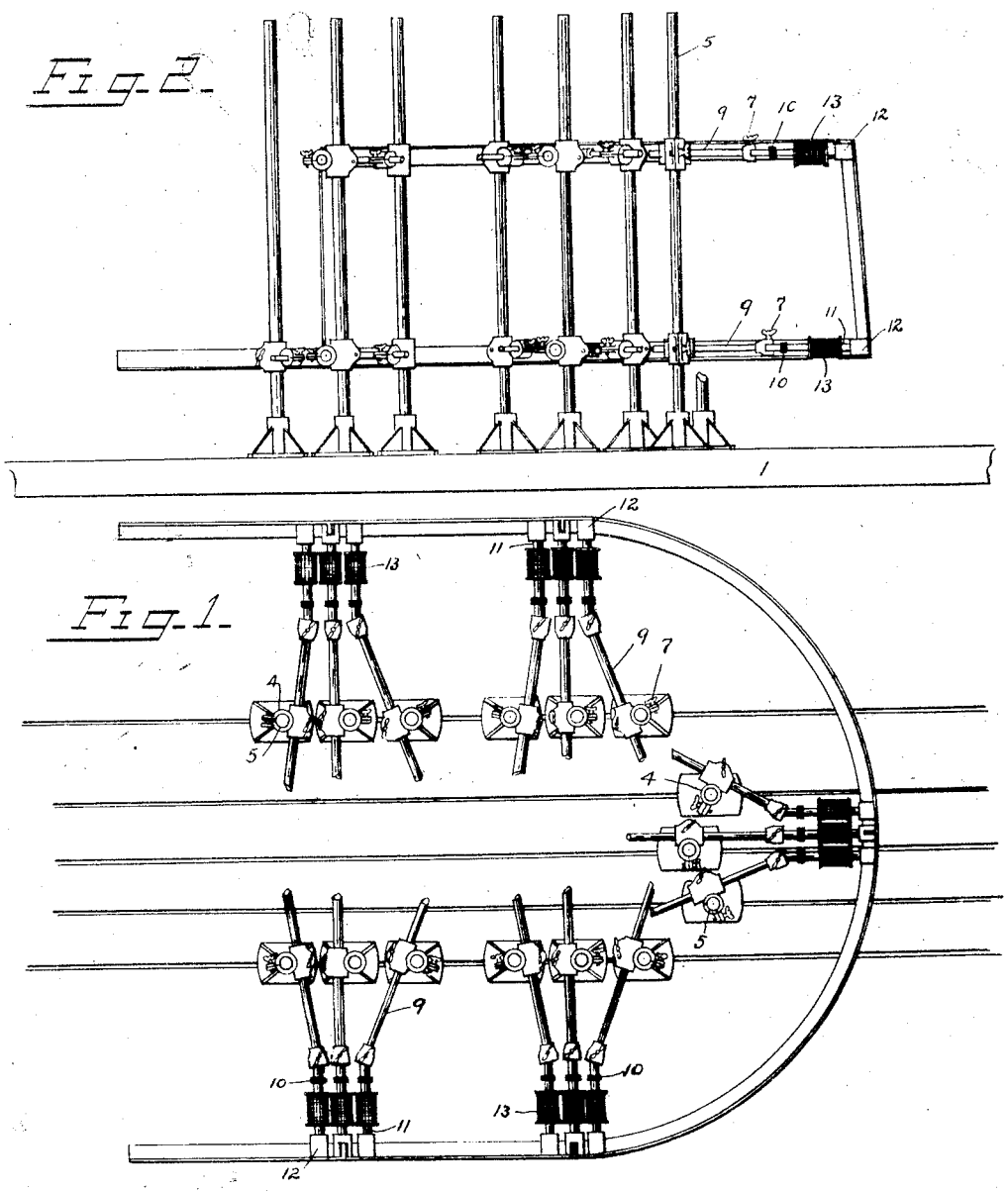

E. A. FALLER.
METHOD OF AND APPARATUS FOR ELECTRIC WELDING.
APPLICATION FILED FEB. 13, 1913.
1,077,953.
Patented Nov. 4, 1913.
2 SHEETS—SHEET 2.
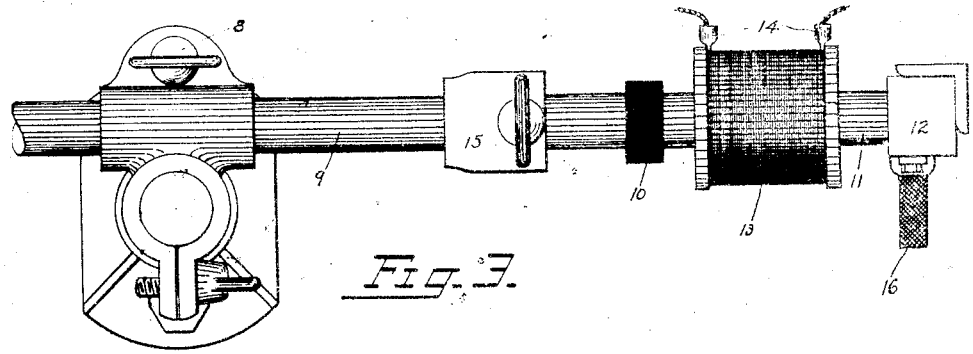
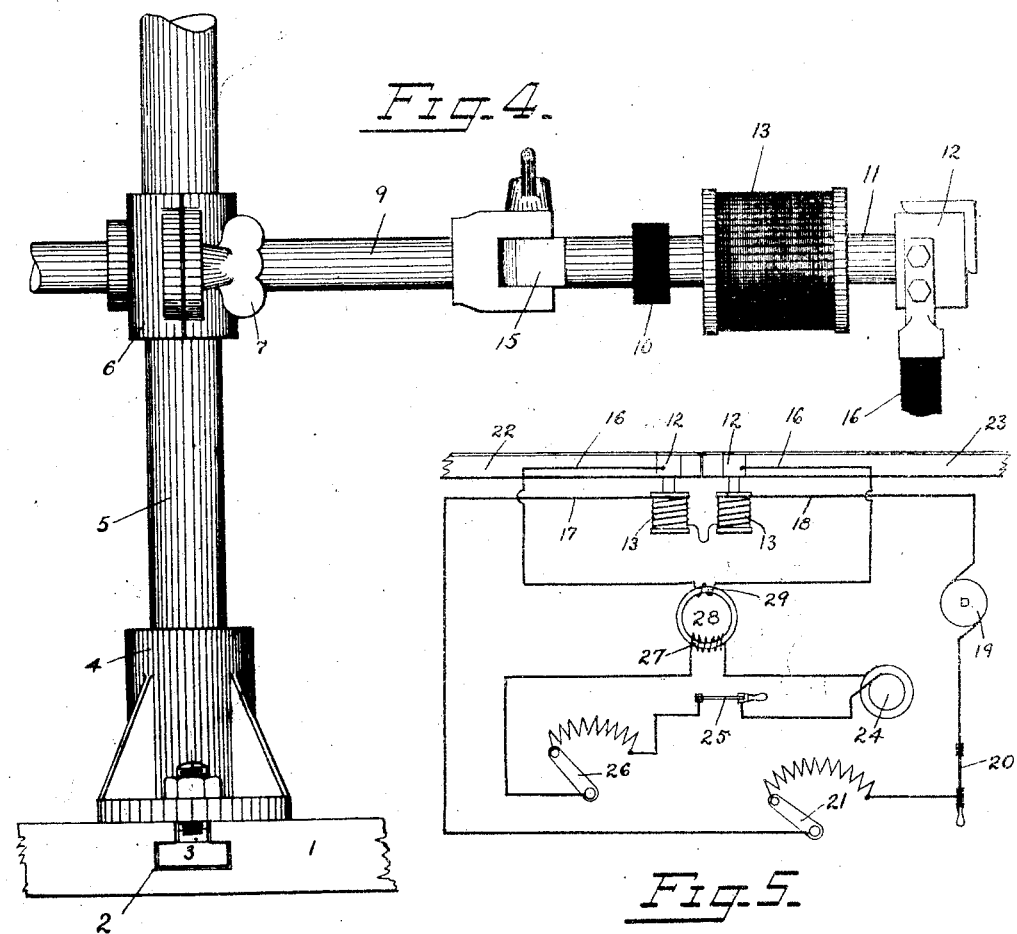

UNITED STATES PATENT OFFICE.

ERNEST A. FALLER, OF NEW YORK, N. Y., ASSIGNOR TO KENNETH O. CHISHOLM, OF NEW YORK, N. Y.

METHOD OF AND APPARATUS FOR ELECTRIC WELDING.

1,077,953.  Specification of Letters Patent.  Patented Nov. 4, 1913.

Application filed February 13, 1913. Serial No. 748,163.

*To all whom it may concern:*

Be it known that I, ERNEST A. FALLER, a citizen of the United States, residing at New York, in the county and State of New York, have invented new and useful Improvements in Methods of and Apparatus for Electric Welding, of which the following is a specification.

Elements of electric metal welding apparatus for holding in position the parts while they are heated, have heretofore been strictly of a mechanical nature. They consisted of supports, clamps, etc., for holding the parts to be united by welding, in a correlated position and required individual handling of each device, should it have been desired to weld together, in one integral structure, constituent parts of a greater number than two.

While it is old in the art to employ electromagnetic devices for lifting, holding and transporting metal parts, it is thought to be broadly new to use electromagnetic devices for holding in proper correlation the constituent parts of an entire structure, such as an automobile chassis, and simultaneously electrically welding together by means of suitable apparatus, the abutting ends of all these parts and forming thereby an integral structure.

The invention, therefore, consists broadly in the combination in one organization, of electromagnetic holding means and electric heating means, and in the method of simultaneously employing electric energy for welding a structure and holding the same in an assembled state during the welding operation.

In the accompanying drawings Figure 1, is a plan view, and Fig. 2, a side elevation of the complete machine, without any unnecessary details, Fig. 3, is a plan view on an enlarged scale, of one of the elements for holding and welding, Fig. 4, is a side elevation of such an element and Fig. 5, is a diagrammatic view, showing the electric and mechanical instrumentalities in operative relation.

The apparatus proper consists of a base plate 1, of sufficient dimensions to accommodate the largest piece of work liable to be handled by the machine. This base plate 1 is provided with a series of T-slots 2, adapted to receive bolts 3, with which the elements are adjustably secured to the plate 1.

The work holders proper consist of a base 4, of a strength and dimensions sufficient to hold an upright shaft 5. The length of this shaft is so proportioned, as to admit adjustment within the height limits of the largest piece of work handled. The shaft 5 carries a slidable and removable fitting 6, having two bores at substantially right angles to each other. The vertical bore fits the shaft 5 and can be clamped thereto at any height and at any horizontal angle, by means of the wing nut 7. The horizontal bore, also provided with a clamp nut 8, is slidable on the horizontal shaft 9. This shaft 9 carries, by means of an insulating joint 10, a pole shoe 11, having an extension 12. Over the rear part of this pole shoe, is removably slipped the bobbin of an electromagnet 13, having binding posts 14. A hinged joint 15 is provided on the shaft 9, which permits the setting of the pole shoe at any angle relative to the shaft 9. A copper cable 16 of suitable dimensions is removably attached to the pole shoe extensions 12 for the purpose of carrying the welding current and wires 17 and 18 are connected to the binding posts 14 for carrying the current to energize the electromagnets 13.

The diagram, forming Fig. 5 of the drawings, illustrates the electrical conditions under which the system operates. Only one pair of pole shoe extensions 12, 12, forming the welding tool proper, are shown in the diagram, but Figs. 1 and 2, clearly indicate that three or more elements may be combined on one proposed joint, to bring about the desired result.

Direct electric current is supplied to the magnets 13 from the dynamo 19, through the switch 20. The adjustable rheostat 21 controls the amount of current flowing through the circuit, and consequently, the degree of energization of the magnet and the pull with which the working pieces 22 and 23 are held against the pole shoe extensions 12.

Alternating current is supplied to the pole shoe extensions 12 from the alternator 24, through the switch 25, the rheostat 26 and the primary coil 27 of the transformer 28. The secondary coil 29 of the transformer is connected to the pole shoe extensions 12, either in series, as shown, or in parallel, if so desired, by means of the cables 16.

The transformer 28 is of the step-down type generally used in electric welding. The amount of metallic copper in the entire circuit is so proportioned that no appreciable heating takes place in any other part of the circuit, except at the abutting ends of the working pieces 22 and 23.

The various elements of the work holding apparatus and now arranged on the base plate, according to a pattern or sample of the article to be assembled by this process, so that all the pole shoe extensions forming the holding and welding tools, are in proper relative position, adjacent to each and every joint of the intended structure. When all this is done, the pattern or sample of the structure is removed and the direct electric current then turned on to energize all the electromagnets 13. The various parts constituting the final structure, have previously been cut and machined to the proper dimensions and are now placed on the pole shoe extensions and, of course, held thereon by magnetic attraction. It may be preferred not to turn on the electric current, until a part has been placed in its proper position, in which case it will be necessary to provide individual switches 20, for each individual magnet.

When all the parts needed for any one particular structure, have been placed in position, the electric welding current is supplied to all the pole shoe extensions 12, in such a manner, that the current is caused to travel through the abutting ends of any two or more parts, forming the final structure. Inasmuch as these ends represent the points of highest resistance in the electric circuit, they become heated to a welding point, the intensity of the heat of which is easily regulated by means of the rheostat 26.

As soon as the welding has actually taken place, the electric current is shut off the welding circuit, and the structure permitted to cool. When the cooling process has proceeded far enough, the electric current is turned off the electromagnets, and the finished structure is removed from the work holding devices.

Claims:

1. The method of electric welding which consists in causing electromagnetic means to attract the abutting ends of a work piece for holding the same in position, and in supplying electric energy to said ends for heating the same to welding temperature.

2. The method of electric welding which consists in causing electromagnetic means to attract the abutting ends of a work piece for holding the same in position, and in simultaneously supplying electric energy to said ends for heating the same to welding temperature.

3. The combination with electromagnetic means adapted to attract the abutting ends of a work piece for holding the same in position, of a circuit including said ends and a source of electric energy for heating said ends to welding temperature.

4. The combination with work holding means, of an insulated member thereon, means for magnetizing said member, an extension on said member, and means for supplying electric energy to said extension for heating a work piece held thereby.

5. The combination with an upright support, of an arm carried thereon, an insulated extension on said arm, means for magnetizing said insulated extension, a pole shoe extension on said insulated extension, and means for supplying electric energy to said pole shoe extension.

In witness whereof the inventor has hereunto set his hand in the presence of two subscribing witnesses, at New York, in the county and State of New York, this 31st day of January, nineteen hundred and thirteen.

ERNEST A. FALLER.

In presence of—
SIGMUND HERZOGG,
RALPH JULIAN SACHERS.